(12) United States Patent
Gong et al.

(10) Patent No.: US 9,264,704 B2
(45) Date of Patent: Feb. 16, 2016

(54) FRAME IMAGE QUALITY AS DISPLAY QUALITY BENCHMARK FOR REMOTE DESKTOP

(71) Applicant: VMware, Inc., Palo Alto, CA (US)

(72) Inventors: Yue Gong, Beijing (CN); Yanni Wu, Beijing (CN); Meng Chen, Beijing (CN); Yang Liu, Beijing (CN); Ning Ge, Beijing (CN)

(73) Assignee: VMware, Inc., Palo Alto, CA (US)

( * ) Notice: Subject to any disclaimer, the term of this patent is extended or adjusted under 35 U.S.C. 154(b) by 417 days.

(21) Appl. No.: 13/931,938

(22) Filed: Jun. 30, 2013

(65) Prior Publication Data

US 2015/0002681 A1 Jan. 1, 2015

(51) Int. Cl.
G06K 9/00 (2006.01)
H04N 17/00 (2006.01)

(52) U.S. Cl.
CPC .................................. H04N 17/004 (2013.01)

(58) Field of Classification Search
USPC ........................................................ 382/112
See application file for complete search history.

(56) References Cited

U.S. PATENT DOCUMENTS

| | | | |
|---|---|---|---|
| 7,768,937 B2 * | 8/2010 | Isambart | H04B 17/309 370/248 |
| 8,166,107 B2 | 4/2012 | Makhija et al. | |
| 8,209,539 B2 * | 6/2012 | Baudry | G06T 1/0085 713/178 |
| 8,347,344 B2 | 1/2013 | Makhija et al. | |
| 9,113,177 B2 * | 8/2015 | Molander | H04N 21/23439 |
| 2008/0204592 A1 | 8/2008 | Jia et al. | |
| 2010/0162338 A1 * | 6/2010 | Makhija | H04N 7/173 725/114 |
| 2012/0096146 A1 | 4/2012 | Barnett | |
| 2012/0194874 A1 * | 8/2012 | Milanski | G06K 9/036 358/448 |
| 2012/0260277 A1 * | 10/2012 | Kosciewicz | H04N 17/004 725/14 |
| 2013/0096904 A1 * | 4/2013 | Hui | H04L 65/605 703/21 |
| 2013/0097426 A1 | 4/2013 | Agrawal et al. | |
| 2014/0105576 A1 * | 4/2014 | Lou | H04N 21/4302 386/241 |
| 2014/0136944 A1 * | 5/2014 | Harris | G06F 17/211 715/234 |
| 2014/0177734 A1 * | 6/2014 | Carmel | H04N 19/00903 375/240.26 |
| 2015/0007029 A1 * | 1/2015 | Gong | H04N 21/44231 715/719 |

OTHER PUBLICATIONS

Omer Boyaci et al., "vDelay: a Tool to Measure Capture-to-Display Latency and Frame Rate", 11th IEEE International Symposium on Multimedia, 2009, pp. 194-200.

* cited by examiner

Primary Examiner — John Strege

(57) ABSTRACT

A method is provided to measure an overall image quality score for a remote desktop on a first computer and accessed from a second computer. The method includes playing a video timestamp on the remote desktop at the first computer where the video timestamp includes unique timestamps, screen capturing first computer frames of the remote desktop at the first computer and second computer frames of the remote desktop at the second computer at the same time, determining a frame image quality score for each second computer frame by comparing the client screen to a corresponding baseline first computer frame, and determining the overall image quality score for the remote desktop from frame image quality scores of the second computer frames.

23 Claims, 7 Drawing Sheets

FRAME IMAGE QUALITY AS DISPLAY QUALITY BENCHMARK FOR REMOTE DESKTOP

CROSS-REFERENCE TO RELATED APPLICATION

This application is related to U.S. patent application Ser. No. 13/931,933, entitled "Relative Frame Rate as Display Quality Benchmark for Remote Desktop," which is concurrently filed, commonly owned, and incorporated by reference in its entirety.

BACKGROUND

In a typical virtual desktop infrastructure (VDI) architecture, displays and input devices are local, and applications execute remotely in a server. A user's desktop is typically hosted in a datacenter or cloud, and the user remotely interacts with her desktop via a variety of endpoint devices, including desktops, laptops, thin clients, smart phones, and tablets. There are many other instances where users may interact with a computer system remotely.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

In the drawings.

DETAILED DESCRIPTION

User experience is a key consideration when organizations decide on software for deploying remote desktops. An important way to measure user experience is to determine the display quality visually seen by the users. Thus what is needed is a mechanism to measure display quality in a remote desktop environment.

In accordance with examples of the present disclosure, methods are provided to measure the display quality of a remote desktop that an end user sees on a client. The methods compare the screen the end user sees at the client side against what the end user should see on the screen at the server side. Two indicators of display quality are provided: (a) a relative frame rate and (b) an overall image quality score.

The relative frame rate compares a frame rate at the client side against a baseline frame rate at the server side. To compare the frame rates, a timestamp video is played at the server side and the screens at the server side and the client side are captured. A frame rate on each side is determined as the number of captured frames with unique timestamps divided by the duration of the capture, which is calculated from the timestamps on the first and the last captured frames.

The overall image quality score compares each frame captured at the client side against a baseline frame captured at the server side to determine frame image quality scores, and then the overall image quality is calculated from the frame image quality scores. For each frame image quality score, the frames are compared on a block basis where the frame image quality score is a weighted average of the block similarity scores and bad blocks are given additional weight. The overall image quality score is a weighted average of the frame image quality scores for the client frames and bad frames where bad blocks propagate through are given additional weight.

Figure 1:
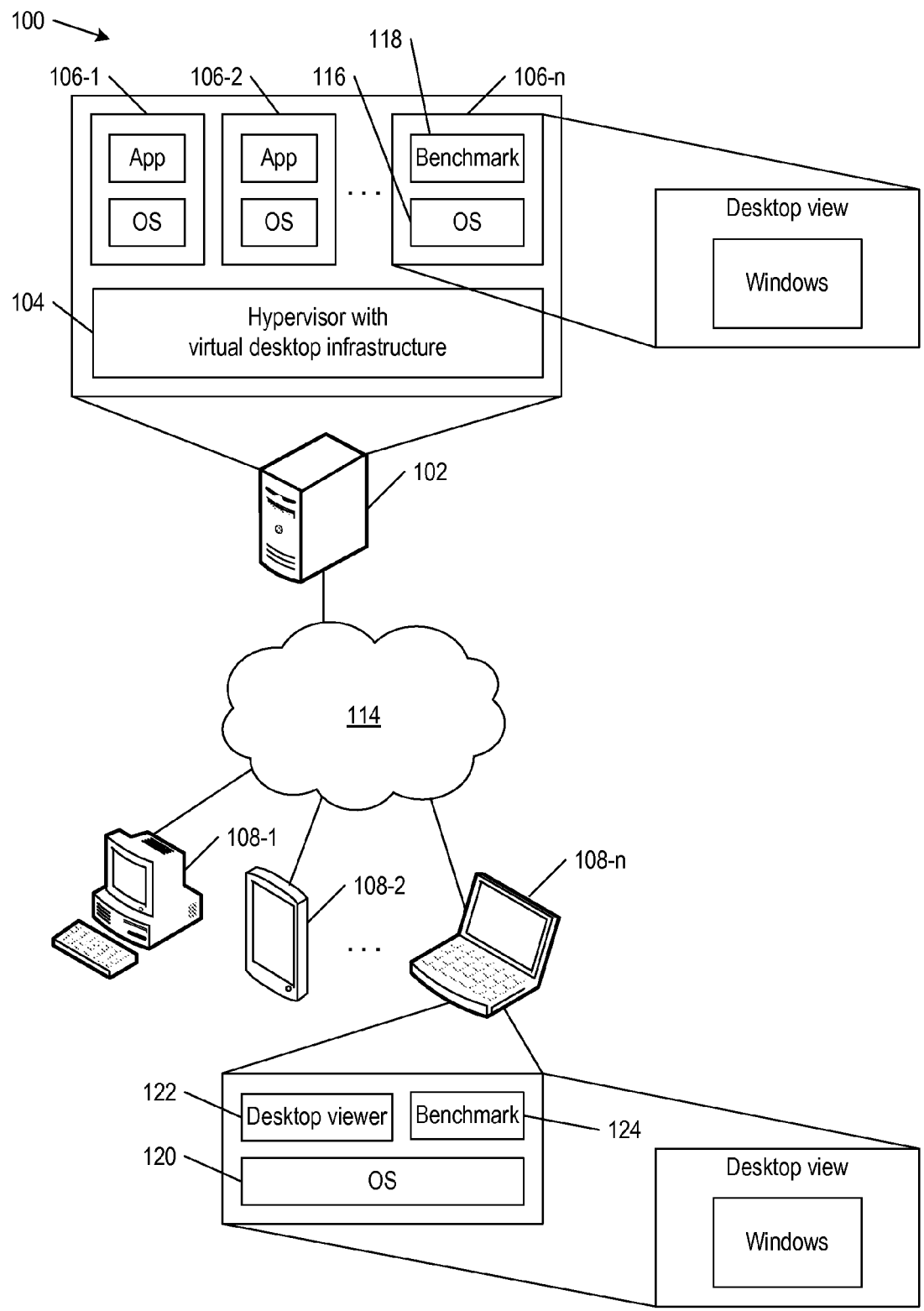
FIG. 1 is a block diagram illustrating a simplified view of a remote desktop system in examples of the present disclosure.

FIG. 1 is a block diagram illustrating a simplified view of a remote desktop system 100 in examples of the present disclosure. System 100 includes at least one server computer 102 (e.g., "first computer") that provides virtual desktop services to remote users. Server computer 102 runs a hypervisor 104 with virtual desktop infrastructure (VDI) that manages the assignment of virtual machines (VMs) 106-1, 106-2 ... 106-$n$ (collectively as "VMs 106") to remote users. The remote users use clients 108-1, 108-2 ... 108-$n$ (collectively as "clients 108") to access remote desktops on VMs 106. Clients 108 may be laptops, desktops, tablet computers, and smart phones. Clients 108 provide display presentation and input/output capabilities associated with virtual machines 106. Clients 108 communicate with server 102 via a network 114. VMs 106 communicate with corresponding clients using a remote display protocol. The remote display protocol may be any display remoting protocol, such as PC-over-IP (PCoIP), available from Teradici, Corp., Remote Desktop Protocol (RDP) available from Microsoft, or Blast, an HTML-based display remoting protocol available from VMware, Inc. Depending on processor and network bandwidth, the remote display protocol may send the remote desktop at about 30 frames per second (fps).

VM 106-$n$ includes a guest operating system (OS) 116 and a benchmark server application 118. Client 108-$n$ (e.g., "second computer") includes an OS 120, a desktop viewer application 122, and a benchmark client application 124. Desktop viewer application 122 displays the remote desktop of VM 106-$n$ on client 108-$n$. Benchmark server application 118 and benchmark client application 124 work together to benchmark the user experience of the VDI in system 100.

Figure 2:
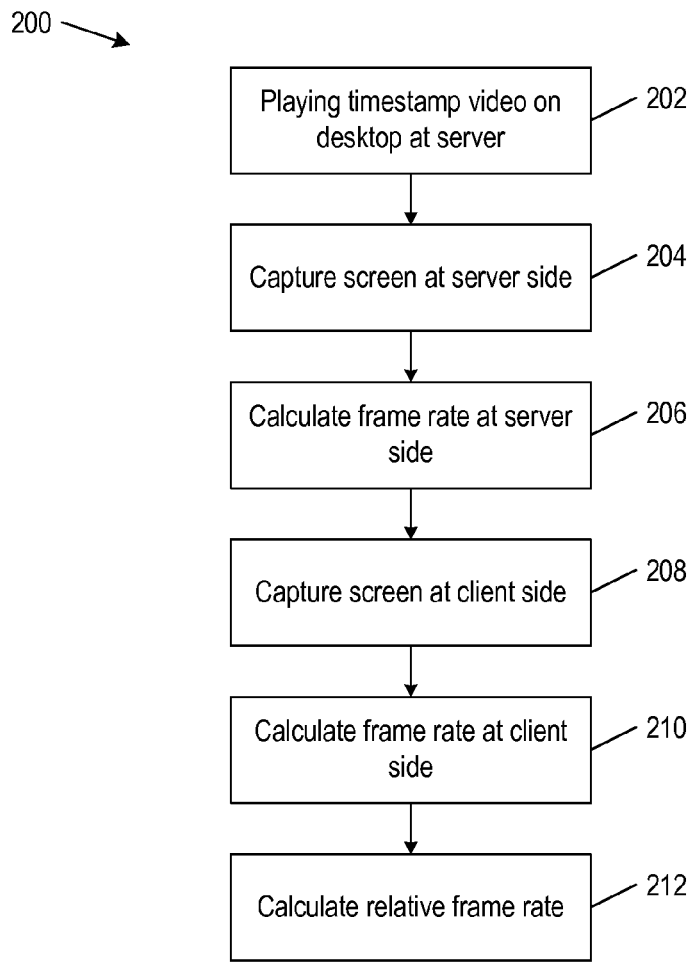
FIG. 2 is a flowchart of a method for a benchmark server application and a benchmark client application of FIG. 1 to determine a relative frame rate in examples of the present disclosures.

FIG. 2 is a flowchart of a method 200 for benchmark server application 118 (FIG. 1) and benchmark client application 124 (FIG. 1) to determine a relative frame rate in examples of the present disclosures. Method 200 may begin in block 202.

Figure 3:
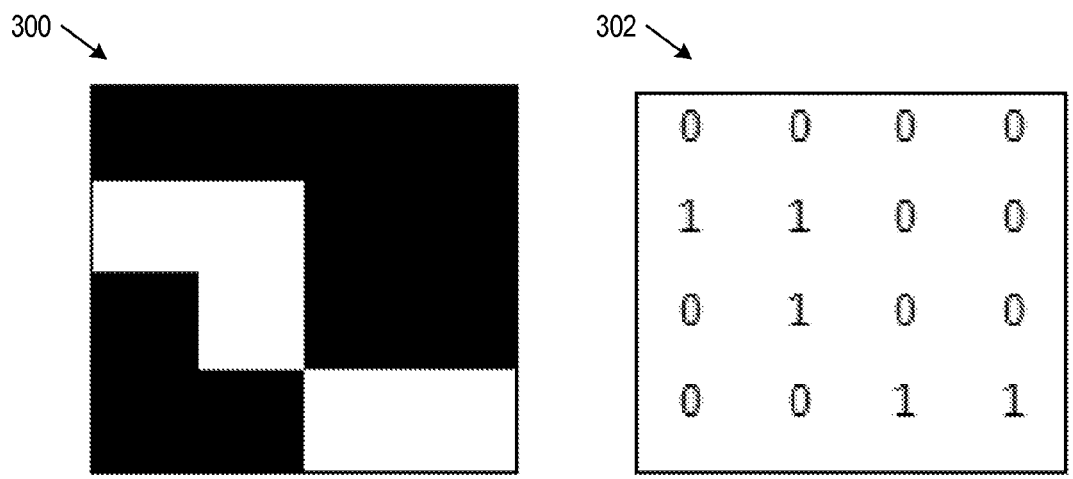
FIG. 3 shows a timestamp from a timestamp video in examples of the present disclosure.

In block 202, benchmark server application 118 plays a timestamp video on the remote desktop on VM 106-$n$ at the server side. The timestamp video is played back at a fast rate, such as 100 fps. The timestamp video is made up of individual timestamps that are small in size, such as four-by-four pixels. Each timestamp has black and white pixels where a black pixel represents a zero (0) bit and a white pixel represents a one (1) bit. FIG. 3 shows a timestamp 300 in examples of the present disclosure. FIG. 3 also shows the pixels in timestamp 300 mapped to a binary code 302 of 0000110001000011, which is 3,139 in decimal. Note that four-by-four pixels timestamps provide a time span of (2^16 frames)/(100 fps) =655.36 seconds 11 minutes. Referring back to FIG. 2, block 202 may be followed by block 204.

In block 204, benchmark server application 118 captures the screen on VM 106-$n$ at the server side for a predetermined amount of time, such as one to several minutes. In one example, benchmark server application 118 captures the screen at a rate, such as 200 fps, faster than the playback rate of the timestamp video. Benchmark server application 118 reads the timestamp on each captured frame. If multiple frames have the same timestamp, benchmark server application 118 only retains one, such as the first one. Benchmark server application 118 then counts the number of captured frames with unique timestamps. Block 204 may be followed by block 206.

In block 206, benchmark server application 118 calculates the frame rate on VM server 106-$n$ at the server side. The frame rate is calculated as follows:

$$FrameRate = \frac{SUM \text{ of unique frames}}{Time \text{ span of screen capture}}, \quad (1)$$

where "SUM of unique frames" is the count from block 204, and the "Time span of screen capture" is equal to the difference in last and the first timestamps divided by the timestamp playback rate (e.g., 100 fps). Block 206 may be followed by block 208.

In block 208, benchmark client application 124 captures the screen at client 108-$n$ on the client side for a predetermined amount of time, such as one to several minutes. In one example, benchmark client application 124 captures the screen at a rate, such as 50 fps, faster than the rate of the remote display protocol, such as 30 fps. Benchmark client application 124 may save the captured frames in a shared folder on VM 106-$n$ that can be accessed by benchmark server application 118. Block 208 may be followed by block 210.

In block 210, benchmark server application 118 calculates the frame rate at client 108-$n$ on the client side. First, benchmark server application 118 retrieves the captured frames from the shared folder. As in block 204, if multiple frames have the same timestamp, benchmark server application 118 only retains one, such as the first one. Benchmark server application 118 then counts the number of captured frames with unique timestamps.

The timestamps captured at client 108-$n$ on the client side may be distorted by the remote display protocol as it tries to relay the remote desktop while conserving network bandwidth. To correctly read the value of the timestamps, the brightness of each pixel in a timestamp is determined and then each pixel is binarized as a black pixel or a white pixel by comparing its brightness against a brightness threshold. In one example, the brightness of each pixel is determined as follows:

$$Brightness = 0.299R + 0.587G + 0.144B, \quad (2)$$

where R, G, B are the color values of the pixel. In one example a pixel is considered white if its brightness is greater than 128, or otherwise the pixel is considered black.

The frame rate at client 108-$n$ at the client side is also calculated with equation (1) described above. Block 210 may be followed by block 212.

In block 212, benchmark server application 118 calculates the relative frame rate as follows:

$$RelativeFrameRate = \frac{\text{frame rate at client side}}{\text{frame rate at server side}}.$$

Figure 4:
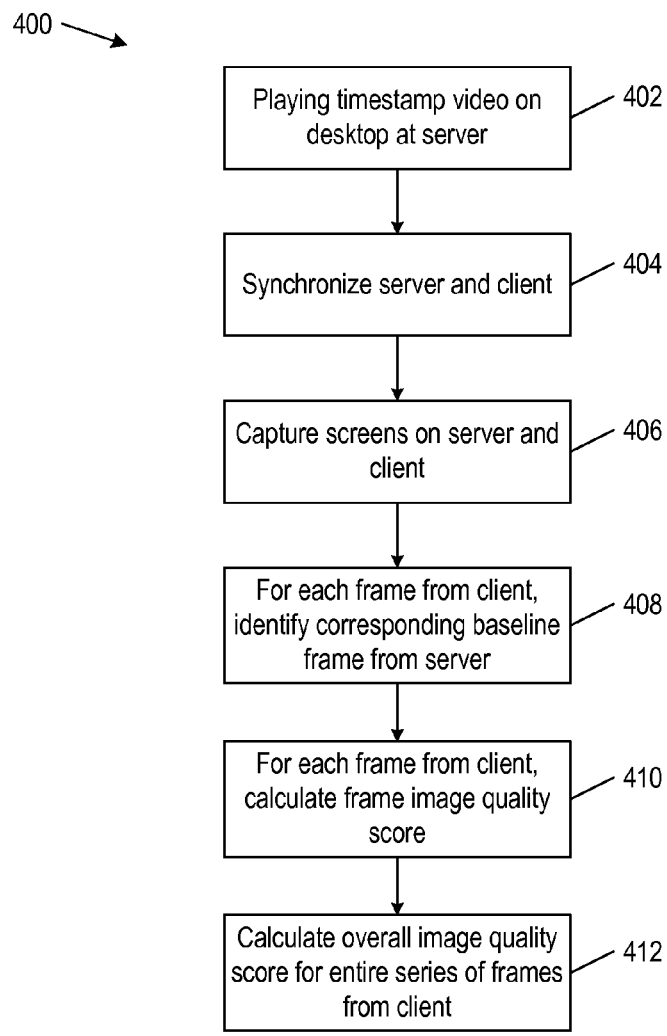
FIG. 4 is a flowchart of a method for the benchmark server application and the benchmark client application of FIG. 1 to determine an overall frame image quality in examples of the present disclosures.

FIG. 4 is a flowchart of a method for benchmark server application 118 (FIG. 1) and benchmark client application 124 (FIG. 1) to determine an overall frame image quality in examples of the present disclosures. Method 400 may begin in block 402.

In block 402, benchmark server application 118 plays a timestamp video on the remote desktop on VM 106-$n$ at the server side. As in block 202 (FIG. 2), the timestamp video is played back at a fast rate, such as 100 fps, and the timestamp video is made up of individual timestamps that are small in size, such as four-by-four pixels. Block 402 may be followed by block 404.

In block 404, benchmark server application 118 and benchmark client application 124 synchronize with each other in preparation to capture screen on both sides at the same time. Benchmark server application 118 and benchmark client application 124 may synchronize with each other through a virtual channel between them. Block 404 may be followed by block 406.

In block 406, benchmark server application 118 captures the screen on VM 106-$n$ at the server side for a predetermined amount of time, such as one to several minutes. Similar to block 204 (FIG. 2) in one example, benchmark server application 118 captures the screen at a rate, such as 200 fps, faster than the playback rate of the timestamp video.

At the same time, benchmark client application 124 captures the screen at client 108-$n$ on the client side for a predetermined amount of time, such as one to several minutes. Similar to block 208 (FIG. 2) in one example, benchmark client application 124 captures the screen at a rate, such as 50 fps, faster than the rate of the remote display protocol, such as 30 fps. Benchmark client application 124 saves the captured frames in a shared folder on VM 106-$n$ that can be accessed by benchmark server application 118. Block 406 may be followed by block 408.

In block 408, benchmark server application 118 determines, for each captured frame at client 108-$n$ on the client side (hereafter "client frame" or "second computer frame"), a corresponding captured frame at server 106-$n$ on the server side (hereafter "server frame" or "first computer frame") based on timestamps on the frames. The corresponding server frame is a baseline for determining frame image quality. The details of block 408 are described later in reference to FIGS. 5 and 6. Block 408 may be followed by block 410.

In block 410, benchmark server application 118 calculates a frame image quality score for each client frame compared to its baseline server frame. Instead of comparing the entire frame, benchmark server application 118 may compare a small area (e.g., a comparison area of 300 pixels by 300 pixels) and such a comparison area may be randomly moved from frame to frame. The details of block 410 are described later in reference to FIGS. 7 and 8. Block 410 may be followed by block 412.

In block 412, benchmark server application 118 calculates an overall frame image quality score for the entire series of client frames based on the individual frame image quality scores determined in block 410. In particular, the overall image quality score considers the aggregate effect of "bad blocks" that propagate through the frames over time. The details of block 412 are described later in reference to FIGS. 7 and 8.

Figure 5:
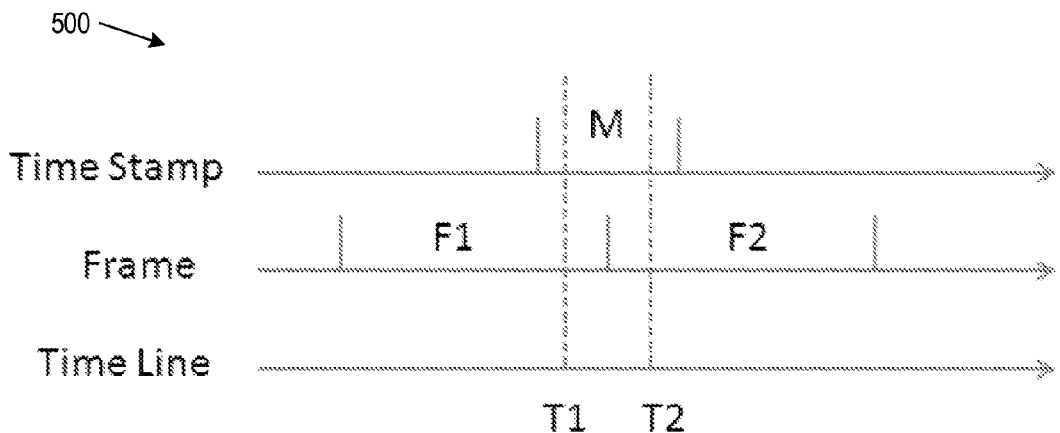
FIG. 5 is a timeline illustrating an issue with synchronizing timestamps on captured frames in examples of the present disclosure.

As introduced above, in block 408, benchmark server application 118 determines a baseline server frame for each client frame based on the timestamps on the frames. However, due to network latency, the timestamps on the client frames and the server frames may not be completely synchronized. FIG. 5 is a timeline illustrating this issue in examples of the present disclosure. A timestamp M is played on the remote desktop on VM 106-n at the server side just as the screen changes from frame F1 to frame F2. Thus a captured frame may be frame F1 with timestamp M or frame F2 with timestamp M. For example, benchmark server application 118 may capture frame F1 with timestamp M and benchmark client application 124 may capture frame F2 with timestamp M, or vice versa. Thus a method is needed to handle such scenarios.

Figure 6:
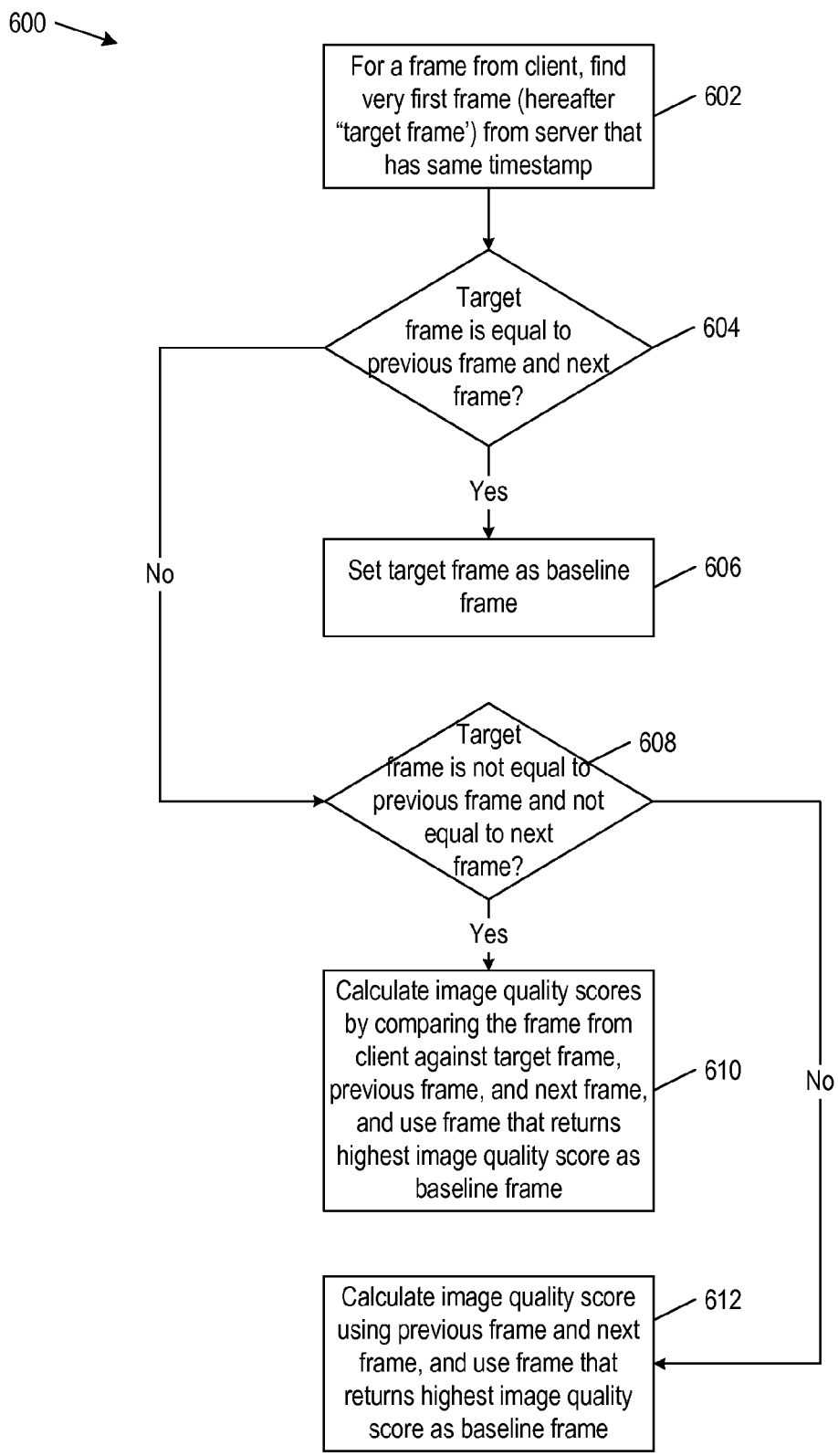
FIG. 6 is a method for the benchmark server application of FIG. 1 to determine the correspondence between captured frames at the client and captured frames at the server in examples of the present disclosures.

FIG. 6 is a method 600 for benchmark server application 118 (FIG. 1) to determine the correspondence between client frames and baseline server frames in examples of the present disclosures. Method 600 is performed by benchmark server application 118 for each client frame received from benchmark client application 124 (FIG. 1). Method 600 may begin in block 602.

In block 602, benchmark server application 118 finds the first frame (hereafter "target frame") in the server frames that has the same timestamp as a client frame. Block 602 may be followed by block 604.

In block 604, benchmark server application 118 determines if the target frame is the same as the previous server frame and the next server frame in the sequence of captured server frames. For example, benchmark server application 118 calculates an image quality score using a method described later in reference blocks 702 to 710 (FIG. 7) to compare the target frame against another server frame to determine if they are the same. For example, two frames are the same when the image quality score is 100%. When the target frame is the same as the previous server frame and the next server frame, then block 604 may be followed by block 606. Otherwise block 604 may be followed by block 608.

In block 606, benchmark server application 118 sets the target frame as the baseline server frame for the client frame.

In block 608, benchmark server application 118 determines if the target frame is not the same as the previous server frame and the target frame is not the same as the next server frame in the sequence of captured server frames. If so, block 608 may be followed by block 610. Otherwise the target frame is equal to one of the previous server frame and the next server frame, and block 608 may be followed by block 612.

In block 610, benchmark server application 118 calculates three frame image quality scores by comparing the client frame against the target frame, the previous server frame, and the next server frame. A method for calculating a frame image quality score is described later in reference to FIGS. 7 and 8. Benchmark server application 118 then selects the server frame that returns the highest frame image quality score as the baseline frame.

In block 612, benchmark server application 118 calculates two frame image quality scores by comparing the client frame against the previous server frame and the next server frame. A method for calculating a frame image quality score is described later in reference to FIGS. 7 and 8. Benchmark server application 118 then selects the server frame that returns the highest frame image quality score as the baseline frame.

Figure 7:
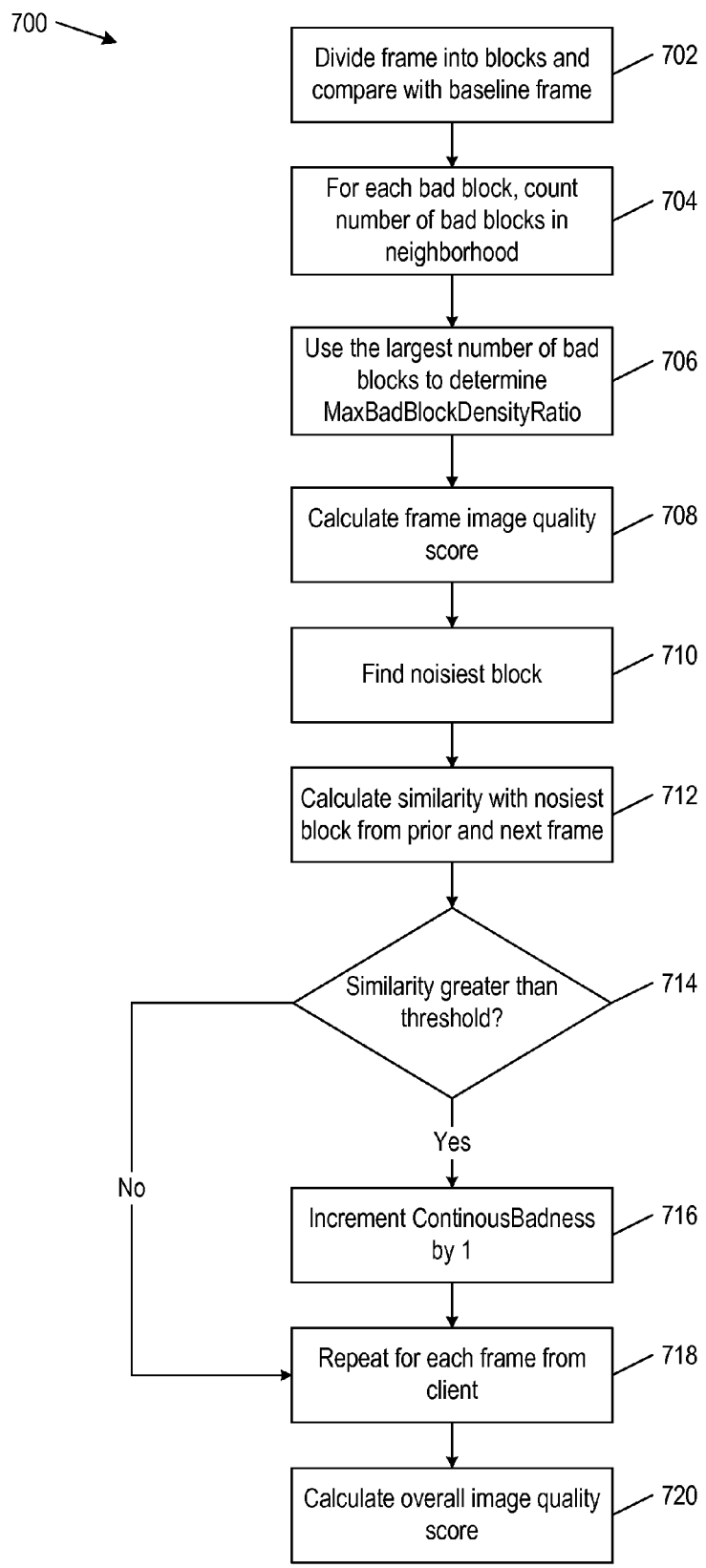
FIG. 7 is a method for the benchmark server application of FIG. 1 to determine frame image quality scores and an overall frame image quality score in examples of the present disclosures.

FIG. 7 is a method 700 for benchmark server application 118 (FIG. 1) to determine frame image quality scores and an overall frame image quality score in examples of the present disclosures. In method 700, blocks 702 to 718 of method 700 may be performed for each client frame to determine frame image quality scores for the sequence of captured client frames. Block 718 may then be followed by method 720 to calculate the overall image quality score for the sequence of captured client frames. Method 700 may begin in block 702.

In block 702, benchmark server application 118 divides a client frame and its baseline server frame into blocks (e.g., 16 by 16 pixels) and then compares the corresponding blocks. By dividing the frames into blocks, a shift in a single pixel will have more weight than if it is compared as part of the entire frame.

The corresponding blocks are compared as follows:

$$BlockSimilarity = \begin{cases} \dfrac{PSNR \times 50\%}{18}, & PSNR \leq 18 \text{ and } SSIM \geq 50\% \\ SSIM, & \text{otherwise} \end{cases} \quad (3)$$

where "BlockSimilarity" is a block similarity score between two corresponding blocks, "PSNR" is the peak signal-to-noise ratio score between two corresponding blocks, and "SSIM" is the structural similarity score between two corresponding blocks. PSNR and SSIM are well-known algorithms for determining image quality or similarity between two images. Equation (3) provides that if the PSNR score is less than or equal to 18 and the SSIM score is greater than or equal to 50%, then the block similarly score is set equal to the PSNR score multiplied by 50% and divided by 18. Otherwise the block similarity score is set equal to the SSIM score. Block 702 may be followed by block 704.

Figure 8:
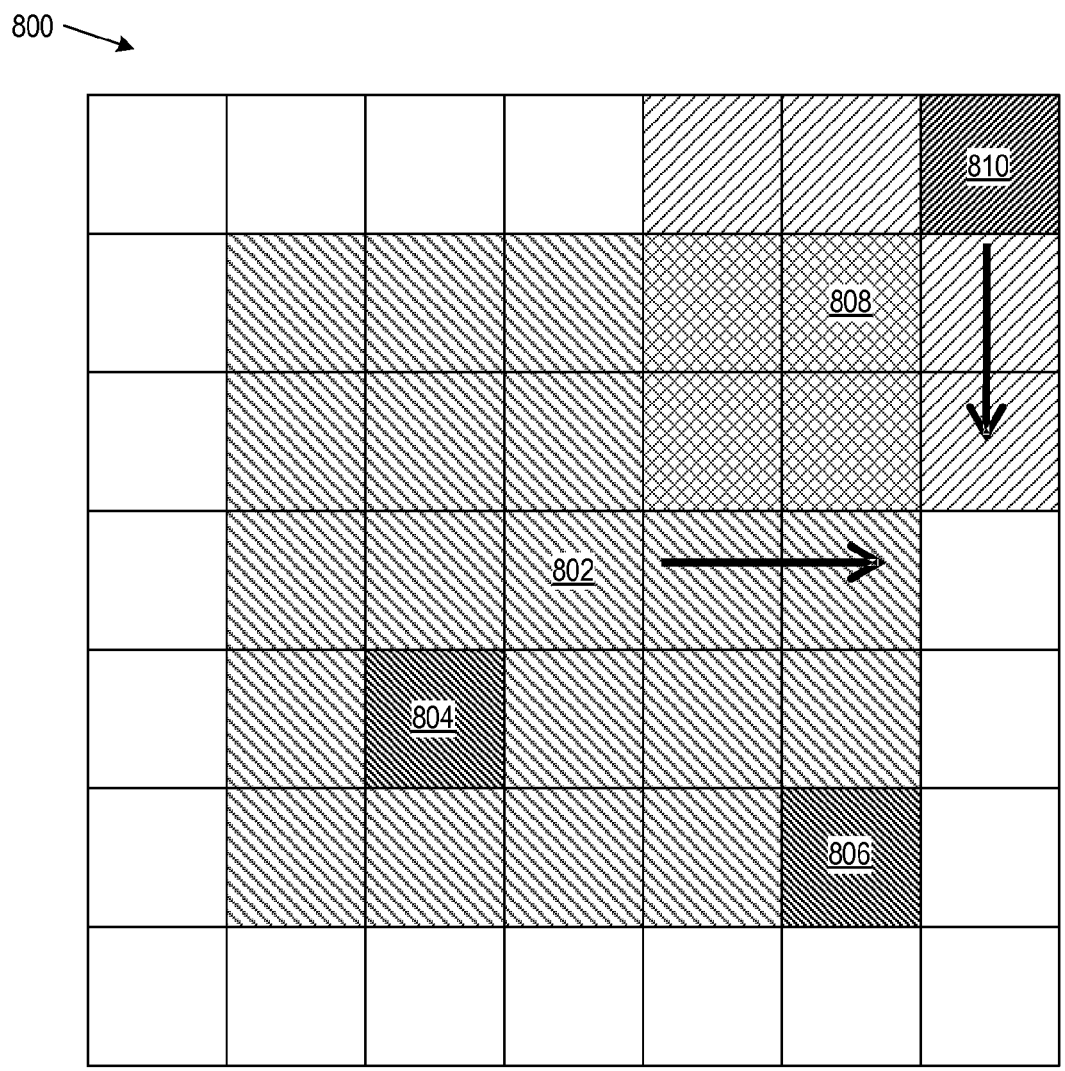
FIG. 8 illustrates part of a comparison area having bad blocks in examples of the present disclosure.

In block 704, benchmark server application 118 finds each bad block in the client frame and then counts the number of bad blocks in a surrounding neighborhood. In one example, a bad block is a block that has a block similar score of less than 50%. In one example, the neighborhood is set to have a radius of 1 to 2% of the comparison area (e.g., a radius of 2 blocks for a 300 by 300 pixel comparison area). FIG. 8 illustrates part of a comparison area having bad blocks 802, 804, 806, 808, and 810 in examples of the present disclosure. For bad block 802, it can be seen that a total of 4 bad blocks are located in its neighborhood. For bad block 810, it can be seen that a total of 2 bad blocks are located in its neighborhood. Referring back to FIG. 7, block 704 may be followed by block 706.

In block 706, benchmark server application 118 determines a "MaxBadBlockDensityRatio" parameter that represents how densely bad blocks are concentrated, which is visually distracting to the end user. The MaxBadBlockDensityRatio is calculated as follows:

$$MaxBadBlockDensityRatio = \dfrac{DensityMaxCount}{(radius \times 2 + 1)^2}, \quad (4)$$

where "DensityMaxCount" is the largest number of bad blocks in a neighborhood that was counted in block 704. Block 706 may be followed by block 708.

In block 708, benchmark server application 118 calculates the frame image quality score using a weighted average of the block similarity scores of the client frame as follows:

$$FrameImageQualityScore = \qquad (5)$$

$$\frac{\sum\limits_{BS>50\%}^{BS=100\%} BS \times A + \sum\limits_{BS=0\%}^{BS=50\%} BS \times A \times (1-BS) \times 10}{\sum\limits_{BS>50\%}^{BS=100\%} A + \sum\limits_{BS=0\%}^{BS=50\%} A \times (1-BS) \times 10} \times$$

$$[(1 - MaxBadBlockDensityRatio) \times 10\% + 90\%],$$

where "BS" is a particular block similarity score and "A" is the number of blocks that has a corresponding BS value. As can be seen in equation (5), bad blocks having similar scores of 50% or less are given more weight. Furthermore, the frame image quality score is further reduced by the MaxBadBlock-DensityRatio parameter. Block 708 may be followed by block 710.

In block 710, benchmark server application 118 finds the noisiest block in the client frame (i.e., the block with the lowest block similarity score). Benchmark server application 118 also finds the noisiest blocks in the prior client frame and the next client frame. Block 710 may be followed by block 712.

In block 712, benchmark server application 118 determines if the noisiest blocks match by calculating two PSNR scores that compare the noisiest block in the client frame against the noisiest blocks in the prior client frame and the next client frame. Block 712 may be followed by block 714.

In block 714, benchmark server application 118 determines if the two PSNR scores are both greater than a threshold, such as 18. If so, it means a bad block is propagating through the captured frames, which is visually distracting to the end user. If the two PSNR scores are both greater than the threshold, then block 714 may be followed by block 716. Otherwise block 714 may be followed by block 718.

In block 716, benchmark server application 118 increments a "ContinuousBadness" parameter by 1. Continuous-Badness is a variable that represents the number of continuous frames through which bad blocks propagate. At the beginning of method 700, ContinuousBadness is initialized to 0. Block 716 may be followed by block 718.

In block 718, benchmark server application 118 calculates an overall image quality score as follows:

$$ImageQualityScore = \qquad (6)$$

$$\frac{\sum\limits_{FIQS=0}^{FIQS=100} FIQS}{\sum\limits_{FIQS=0}^{FIQS=100} A} \times \left[\left(1 - \frac{ContinuousBadness}{\text{sum of frames} - 1}\right) \times 10\% + 90\%\right],$$

where "FIQS" is a particular FrameImageQualtiyScore, and "A" is the number of frames that has a corresponding FIQS value. As can be seen in equation (6), the overall image quality score is a weighted average of the frame image quality scores. The overall image quality score is further reduced by the ContinuousBadness parameter.

Figure 9:
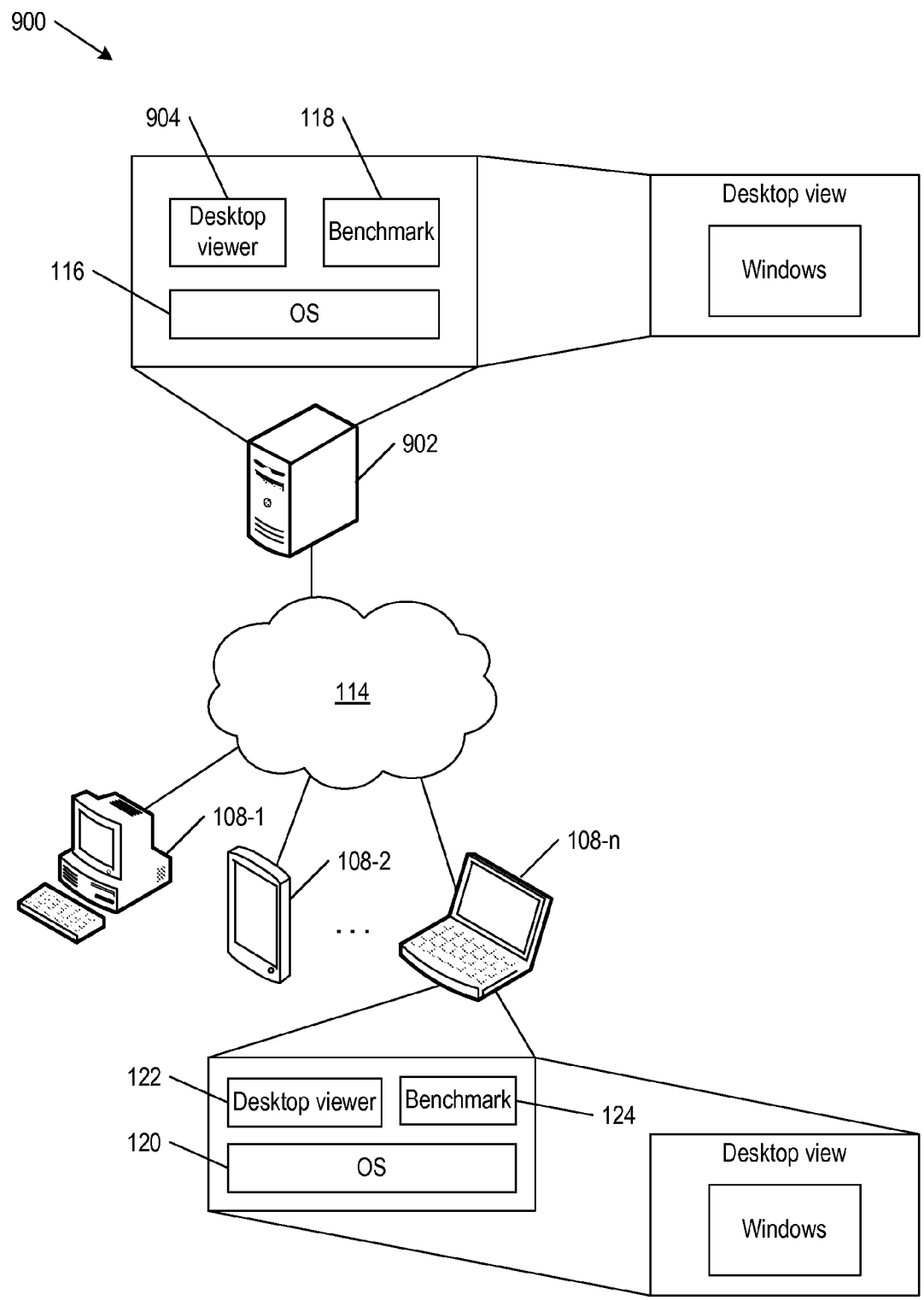
FIG. 9 is a block diagram illustrating a simplified view of a remote desktop system in examples of the present disclosure.

In addition to remote desktops running on VMs, the benchmark methods and applications in the present disclosure may also be applied to systems with remote desktops running on physical machines. FIG. 9 is a block diagram illustrating a simplified view of a remote desktop system 900 in examples of the present disclosure. System 900 is similar to system 100 (FIG. 1) except server computer 102 with VMs 106 is replaced with a computer 902 (e.g., "first computer") running OS 116, a benchmark server application 118, and a desktop viewer application 904. Desktop viewer application 122 communicates with desktop viewer application 904 to display the remote desktop of computer 902 on client 108-*n*. Benchmark server application 118 and benchmark client application 124 work together to benchmark the user experience of the remote desktop in system 900.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to measure an overall image quality score for a remote desktop on a first computer and accessed from a second computer, the method comprising:
    playing a video timestamp on the remote desktop at the first computer, the video timestamp comprising unique timestamps;
    screen capturing first computer frames of the remote desktop at the first computer and second computer frames of the remote desktop at the second computer at the same time;
    determining a frame image quality score for each second computer frame by comparing the client screen to a corresponding baseline first computer frame; and
    determining the overall image quality score for the remote desktop from frame image quality scores of the second computer frames.

2. The method of claim 1, wherein the determining a frame image quality score for each second computer frame comprises:
    selecting a target first computer frame that has a same timestamp as the second computer frame;
    when the target first computer frame is equal to a previous first computer frame and a next first computer frame in the first computer frames, selecting the target first computer frame as the baseline first computer frame;
    when the target first computer frame is not equal to the previous first computer frame and the target first computer frame is not equal to the next first computer frame:
        determining three frame image quality scores by comparing the second computer frame to the target first computer frame, the previous first computer frame, and the next first computer frame; and
        selecting a first computer frame that returns a highest of the three frame image quality scores as the baseline first computer frame; and
    when the target first computer frame is equal to one of the previous first computer frame and the next first computer frame:
        determining two frame image quality scores by comparing the second computer frame against the previous first computer frame and the next first computer frame; and
        selecting a first computer frame that returns a higher of the two frame image quality scores as the baseline first computer frame.

3. The method of claim 1, wherein the determining a frame image quality score for each second computer frame comprises:

dividing at least an area on the second computer frame and a corresponding area on the baseline first computer frame into blocks;

determining a block similarity score for each block in the second computer frame by comparing the block in the second computer frame against a corresponding block in the baseline first computer frame; and setting the frame image quality score equal to a weighted average of blocks similarity scores.

4. The method of claim 3, wherein blocks having similarity scores less than a threshold are given greater weight.

5. The method of claim 3, wherein the determining a similarity score for each block comprises:

determining a peak signal-to-noise ratio (PSNR) score of the block compared to the corresponding block;

determining a structural similarity (SSIM) score of the block compared to the corresponding block;

when the PSNR score is less than or equal to a first threshold and the SSIM score is greater than or equal to a second threshold, setting the block similarity score based only on the PSNR score; and else setting the block similarity score based only on the SSIM score.

6. The method of claim 3, wherein the area is selected randomly from frame to frame.

7. The method of claim 1, wherein the determining a frame image quality score for each second computer frame comprises:

dividing at least an area on the second computer frame and a corresponding area on the baseline first computer frame into blocks;

determining a block similarity score for each block in the second computer frame by comparing the block in the second computer frame against a corresponding block in the baseline first computer frame;

determining bad blocks in the area on the second computer frame that have block similarity scores less than a threshold;

determining a density of bad blocks in a neighborhood around each bad block;

setting the frame image quality score equal to a weighted average of block similarity scores; and reducing the frame image quality score based on a maximum density of bad blocks from densities of bad blocks.

8. The method of claim 7, wherein the determining a density of bad blocks in a neighborhood around each bad block comprises:

determining a number of bad blocks in the neighborhood centered about the bad black; and setting the density of bad blocks equal to a ratio of the number of bad blocks and an window area.

9. The method of claim 1, wherein the determining the overall image quality score for the remote desktop from frame image quality scores of the second computer frames comprises:

for each second computer frame:
detecting noisiest blocks in the second computer frame, in a previous second computer frame from the second computer frames, and a next second computer frame from the second computer frames;
determining if the noisiest blocks match;
when the noisiest blocks match, incrementing a continuous bad block parameter by one;

setting the overall image quality score equal to a weighted average of the frame image quality scores; and reducing the overall image quality score based on the continuous bad block parameter.

10. The method of claim 1, wherein screen capturing the remote desktop at the first computer and the second computer at are synchronized through a virtual channel between the first computer and the second computer.

11. The method of claim 1, wherein the timestamp video is played at a first rate, the screen capturing at the first computer is at a second rate faster than the first rate, the remote desktop is transmitted at a third rate from the first computer to the second computer, and the screen capturing at the second computer is at a fourth rate faster than the third rate.

12. A remote desktop system, comprising:
a first computer;
a virtual machine on the first computer, the virtual machine presenting a remote desktop;
a benchmark server application on the virtual machine, the benchmark server application being configured to:
play a video timestamp on the remote desktop at the first computer, the video timestamp comprising unique timestamps;
screen capture first computer frames of the remote desktop at the first computer at a same time second computer frames are captured of the remote desktop at a second computer;
determine a frame image quality score for each second computer frame by comparing the client screen to a corresponding baseline first computer frame; and
determine the overall image quality score for the remote desktop from frame image quality scores of the second computer frames.

13. The remote desktop system of claim 12, further comprising:
the second computer; and
a benchmark client application on the second computer, the benchmark client application being configured to:
screen capture second computer frames of the remote desktop at the second computer at the same time as screen capture of the first computer frames of the remote desktop at the first computer; and
save the second computer frames in a shared folder with the virtual machine.

14. The remote desktop system of claim 12, wherein the determining a frame image quality score for each second computer frame comprises:
selecting a target first computer frame that has a same timestamp as the second computer frame;
when the target first computer frame is equal to a previous first computer frame and a next first computer frame in the first computer frames, selecting the target first computer frame as the baseline first computer frame;
when the target first computer frame is not equal to the previous first computer frame and the target first computer frame is not equal to the next first computer frame:
determining three frame image quality scores by comparing the second computer frame to the target first computer frame, the previous first computer frame, and the next first computer frame; and
selecting a first computer frame that returns a highest of the three frame image quality scores as the baseline first computer frame; and
when the target first computer frame is equal to one of the previous first computer frame and the next first computer frame:
determining two frame image quality scores by comparing the second computer frame against the previous first computer frame and the next first computer frame; and selecting a first computer frame that returns a higher of the two frame image quality scores as the baseline first computer frame.

15. The remote desktop system of claim 12, wherein the determine a frame image quality score for each second computer frame comprises:
   dividing at least an area on the second computer frame and a corresponding area on the baseline first computer frame into blocks;
   determining a block similarity score for each block in the second computer frame by comparing the block in the second computer frame against a corresponding block in the baseline first computer frame; and
   setting the frame image quality score equal to a weighted average of blocks similarity scores.

16. The remote desktop system of claim 15, wherein blocks having similarity scores less than a threshold are given greater weight.

17. The remote desktop system of claim 15, wherein the determining a similarity score for each block comprises:
   determining a peak signal-to-noise ratio (PSNR) score of the block compared to the corresponding block;
   determining a structural similarity (SSIM) score of the block compared to the corresponding block;
   when the PSNR score is less than or equal to a first threshold and the SSIM score is greater than or equal to a second threshold, setting the block similarity score based only on the PSNR score; and
   else setting the block similarity score based only on the SSIM score.

18. The remote desktop system of claim 15, wherein the area is selected randomly from frame to frame.

19. The remote desktop system of claim 12, wherein the determine a frame image quality score for each second computer frame comprises:
   dividing at least an area on the second computer frame and a corresponding area on the baseline first computer frame into blocks;
   determining a block similarity score for each block in the second computer frame by comparing the block in the second computer frame against a corresponding block in the baseline first computer frame;
   determining bad blocks in the area on the second computer frame that have block similarity scores less than a threshold;
   determining a density of bad blocks in a neighborhood around each bad block;
   setting the frame image quality score equal to a weighted average of block similarity scores; and
   reducing the frame image quality score based on a maximum density of bad blocks from densities of bad blocks.

20. The remote desktop system of claim 19, wherein the determining a density of bad blocks in a neighborhood around each bad block comprises:
   determining a number of bad blocks in the neighborhood centered about the bad black; and
   setting the density of bad blocks equal to a ratio of the number of bad blocks and an window area.

21. The remote desktop system of claim 12, wherein the determine the overall image quality score for the remote desktop from frame image quality scores of the second computer frames comprises:
   for each second computer frame:
      detecting noisiest blocks in the second computer frame, in a previous second computer frame from the second computer frames, and a next second computer frame from the second computer frames;
      determining if the noisiest blocks match;
      when the noisiest blocks match, incrementing a continuous bad block parameter by one;
   setting the overall image quality score equal to a weighted average of the frame image quality scores; and
   reducing the overall image quality score based on the continuous bad block parameter.

22. The remote desktop system of claim 12, wherein the screen capture the remote desktop at the first computer and the second computer at are synchronized through a virtual channel between the first computer and the second computer.

23. The remote desktop system of claim 12, wherein the timestamp video is played at a first rate, the screen capturing at the first computer is at a second rate faster than the first rate, the remote desktop is transmitted at a third rate from the first computer to the second computer, and the screen capturing at the second computer is at a fourth rate faster than the third rate.

* * * * *